United States Patent [19]

Washburn

[11] Patent Number: 4,937,211
[45] Date of Patent: Jun. 26, 1990

[54] HIGH STRENGTH NITRIDE BONDED SILICON CARBIDE REFRACTORIES

[75] Inventor: Malcolm E. Washburn, Princeton, Mass.

[73] Assignee: Norton Company, Worcester, Mass.

[21] Appl. No.: 117,182

[22] Filed: Nov. 4, 1987

Related U.S. Application Data

[63] Continuation-in-part of Ser. No. 871,956, Jun. 9, 1986, abandoned.

[51] Int. Cl.$^5$ ...................... C04B 35/56; C04B 35/58
[52] U.S. Cl. .................................... 501/92; 501/97; 501/98; 501/103
[58] Field of Search ............... 501/92, 97, 98, 103; 428/402, 404

[56] References Cited

U.S. PATENT DOCUMENTS

| | | |
|---|---|---|
| 1,159,264 | 11/1915 | Pfaff . |
| 2,465,672 | 3/1949 | Blaha ........................................ 106/44 |
| 2,609,318 | 9/1952 | Swentzel .................................. 154/43 |
| 2,636,826 | 4/1953 | Nicholson ................................ 106/44 |
| 2,752,258 | 6/1956 | Swentzel .................................. 106/44 |
| 3,468,992 | 9/1969 | Labatti et al. ........................ 501/92 X |
| 3,960,577 | 6/1976 | Prochazka ............................... 106/44 |
| 3,968,194 | 7/1976 | Prochazka ............................... 264/65 |
| 4,184,882 | 1/1980 | Lange ....................................... 106/44 |
| 4,187,116 | 2/1980 | Lange ....................................... 106/44 |
| 4,377,542 | 3/1983 | Mangels et al. ......................... 264/65 |
| 4,388,085 | 6/1983 | Sarin et al. .............................. 51/307 |
| 4,431,431 | 2/1984 | Sarin et al. .............................. 51/295 |
| 4,467,043 | 8/1984 | Kriegesmann et al. ................. 501/88 |

FOREIGN PATENT DOCUMENTS

| | | | |
|---|---|---|---|
| 0066123 | 7/1963 | Canada ..................................... 501/92 |
| 0008669 | 1/1984 | Japan ........................................ 501/98 |
| 0046973 | 3/1985 | Japan ........................................ 501/92 |
| 0728306 | 4/1955 | United Kingdom ................... 501/92 |

*Primary Examiner*—William R. Dixon, Jr.
*Assistant Examiner*—Karl Group
*Attorney, Agent, or Firm*—Arthur A. Loiselle, Jr.

[57] ABSTRACT

An improved silicon nitride bonded silicon carbide refractory is disclosed. The improvement results from coating the silicon carbide grains with, or introducing into the bond during the mix preparation step, zirconium orthosulfate. The resulting product has higher moduli of rupture and elasticity as compared to prior art compositions where zirconia is introduced into the bond.

1 Claim, 1 Drawing Sheet

HIGH STRENGTH NITRIDE BONDED SILICON CARBIDE REFRACTORIES

This is a continuation-in-part application of original application Ser. No. 06/871,956 filed June 9, 1986 now abandoned.

TECHNICAL FIELD

This invention relates to the general field of refractories and particularly to those with a primary component of silicon carbide bonded by silicon nitride formed by reactive nitriding as is well known in the art.

BACKGROUND AND INFORMATION DISCLOSURE STATEMENT

The following publications are representative of the most relevant prior art known to the Applicant at the time of filing the application.

| U. S. Pat. Nos. | | |
|---|---|---|
| 1,159,264 | November 2, 1915 | Pfaff |
| 2,465,672 | March 29, 1949 | Blaha |
| 2,609,318 | September 2, 1952 | Swentzel |
| 2,636,826 | April 28, 1953 | Nicholson |
| 2,752,258 | June 26, 1956 | Swentzel |
| 3,960,577 | June 1, 1976 | Prochazka |
| 3,968,194 | July 6, 1976 | Prochazka |
| 4,184,882 | January 22, 1980 | Lange |
| 4,187,116 | February 5, 1980 | Lange |
| 4,377,542 | March 22, 1983 | Mangels et al |
| 4,388,085 | June 14, 1983 | Sarin et al |
| 4,431,431 | February 14, 1984 | Sarin et al |
| 4,467,043 | August 21, 1984 | Kriegesmann et al |

The general process of bonding silicon carbide particles by reactive nitriding is described in U.S. Pat. No. 2,752,258 of June 26, 1956 to Swentzel. Relatively coarse silicon carbide granules are mixed with much finer silicon and optionally also silicon carbide powder, along with minor amounts of clays or other binding aids, then pressed to give a green body. The latter is converted to a finished refractory by exposure to heat and to nitrogen or a nitrogen-bearing gas such as ammonia under non-oxidizing conditions, normally for at least several hours. By reaction with the nitrogen content of the gas, the fine silicon and some of the fine silicon carbide if any is present are converted into silicon nitride. These basic materials and processes continue in commercial use today and are used in the present invention.

Because silicon nitride has a lower coefficient of thermal expansion than silicon carbide, as nitride bonded refractories cool from the process of manufacturing them, stresses or even porosity can develop as the silicon carbide shrinks more than the silicon nitride with which it is bonded. For the same reason, refractories of this type were widely observed in the early art to be sensitive to thermal shock. One method of ameliorating the thermal sensitivity is described in U.S. Pat. No. 2,609,318 of Sept. 2, 1952 to Swentzel: adding other metals, particularly iron, to the fine silicon powder used for reaction bonding. It was observed that such additions, specifically in the form of ferrosilicon or ferromanganese silicon, led to refractory articles with substantially less thermal sensitivity. A disadvantage was that the added metal oxides also sometimes led to formation of a glaze, capable of staining material in contact with it, on the surface of the refractory. Another teaching of the '318 Swentzel patent was avoidance of this staining problem by forming a refractory article with an exterior portion free from added glaze-forming metals around a core which did contain such metal.

Another expedient for reducing thermal sensitivity is taught in U.S. Pat. No. 2,636,826 of Apr. 28, 1953 to Nicholson, which is the one item of prior art now known to the applicant which is most closely related to the instant invention. Nicholson teaches the use of zirconia, zirconium or a zirconium compound, preferably from 3-7% by weight of zirconia, as part of the bond for nitride bonded silicon carbide refractories. Nicholson also taught that commercial grade silicon powder, which contained about two percent total by weight of oxides of other metals, notably iron, was preferable to purer silicon powder because nitriding was accomplished faster with the less pure silicon powder. Nicholson further taught that the preferable form of zirconium addition was zirconia stabilized by calcium oxide and the preferable method of mixing the zirconia with the other ingredients was by dry tumbling, followed by wet kneading after addition of bentonite gel, which "serves to take up the zirconium oxide and the finely divided silicon powder . . . and distribute them evenly and uniformly throughout the molding mixture." (Nicholson column 4 lines 48-53) Nicholson, although describing the products of his invention as suitable for a wide variety of uses, taught nothing explicit about the modulus of rupture or any other quantitative measure of mechanical strength of the products of his invention.

U.S. Pat. No. 2,465,672 of Mar. 29, 1949 to Blaha taught that zirconium silicate, formed by adding zirconia to silicon carbide powder covered with its natural surface coating of silica, could form a satisfactory bond for a polycrystalline silicon carbide refractory. No nitriding was involved in this teaching, however. A related earlier teaching was in U.S. Pat. No. 1,159,264 of Nov. 2, 1915 to Pfaff, who taught that approximately equal amounts of zirconia and silicon carbide could be mixed together and fired to produce a refractory material. Again, no nitriding was involved.

Another distinct but related type of refractory is exemplified by U.S. Pat. Nos. 3,960,577 of June 1, 1976 and 3,968,194 of July 6, 1976 to Prochazka. These patents describe refractories made by combining about 90% silicon carbide and about 10% silicon nitride powders, together with a boron compound as a densifying aid, and hot pressing the mixture to form a densified ceramic directly. No reactive nitriding is taught, and the primary object of the invention appears to be provision of refractories which have sufficient electrical conductivity to be amenable to electrochemical machining and electrical discharge machining. Still more remote prior art is represented by U.S. Pat. Nos. 4,184,882 of Jan. 22, 1980 and 4,187,116 of Feb. 5, 1980 to Lange; these teach hot pressed composites of silicon carbide, silicon nitride, and other materials, but the composites contain no more than 40% by volume of silicon carbide.

U.S. Pat. No. 4,467,043 of Aug. 21, 1984 to Kriegesmann et al represents the opposite extreme in composition; it teaches refractories composed of at least 98.8% by weight of silicon carbide bonded with an aluminum containing additive rather than with silicon nitride as in the instant invention.

A variety of densifying aids for silicon nitride taught in U.S. Pat. Nos. 4,377,542 of Mar. 22, 1983 to Mangels et al and 4,388,085 of June 14, 1983 and 4,431,431 of Feb. 14, 1984 to Sarin et al. In all of these patents, refractories with silicon nitride as the primary constituent are taught; silicon carbide plays no significant role if any. Zirconia is among the many densifying aids taught (by Sarin '431).

Relatively little attention is apparent in the prior art to the modulus of rupture (MOR) of refractories, even though this is a critical property with respect to the use of refractories as kiln batts or plates. Such batts or plates are relatively thin sheets used to support other materials while firing. It is economically advantageous for the batts or plates to be as thin as possible, so that as little as possible of the expensive space within the high temperature region of the kiln will be occupied by batts, freeing more of the kiln space for production use. Currently, length to thickness ratios of more than about 50 for batts or plates made by nitride bonding silicon carbide are impractical, because of the danger of breakage when such batts are loaded with typical kiln firing loads. This corresponds to a maximum MOR of about 7000 pounds per square inch (psi). An MOR of about 8000 psi at all temperatures between room temperature and at least 1450° C. would significantly improve the loading factors available for kiln batts.

In principle, the increased MOR of batts could be achieved by higher pressure pressing of the green batt before firing, but in practice such pressing is difficult for large batts because of the great size and weight of the mold bands required, and the resulting higher density makes full nitridation very difficult.

DISCLOSURE OF THE INVENTION

The invention is a new high strength refractory composition of matter that is basically silicon nitride bonded silicon carbide grains wherein the silicon carbide grains are coated with zirconium oxide with at least some of the zirconium oxide penetrating into the silicon carbide grains or the bond therefor contains zirconium oxide where the source of zirconium, oxide in both cases, is zirconium orthosulfate. The product exhibits moduli of rupture in excess of 7000 psi (54.13 MPa) at 22° C., 1250° C. and 1450° C. and a ratio of modulus of rupture (MOR) to modulus of elasticity (MOE) of at least $4 \times 10^{-4}$ at room temperature, and generally from $4 \times 10^{-4}$ to $6 \times 10^{-4}$ at that temperature.

As with prior art silicon nitride bonded silicon carbide, the composition of the invention can be formed using coarse silicon carbide grain, 8 to 325 mesh (U.S. Standard Sieve Series) which is blended with a bonding mixture made up of fine silicon metal powder and/or fine reactive silicon carbide powder; the fine silicon powder is 200 mesh and finer and the silicon carbide powder is generally 400 mesh and finer (U.S. Standard Sieve Series). The final powdered bonding mixture includes a small amount of finely ground clay in an amount of from 0.5 to 4% by weight of the total composition. It is also desirable to add a minor amount of an iron oxide to the bonding mixture, particularly if the bonding mixture contains a substantial amount of fine, reactive silicon carbide. The coarse silicon carbide grain should be present in an amount of from 40 to 80% by weight with the remainder being bonding mix which in turn should be made up of 0 to 30% of reactive silicon carbide, 12 to 40% of silicon metal, 0.5 to 4% of clay as pointed out above, and 0.5 to 4% iron oxide, based on the total batch. The final fired product will include 1 to 8% of a glassy phase of which 0.5 to 4% will be the iron oxide.

Figure 1:
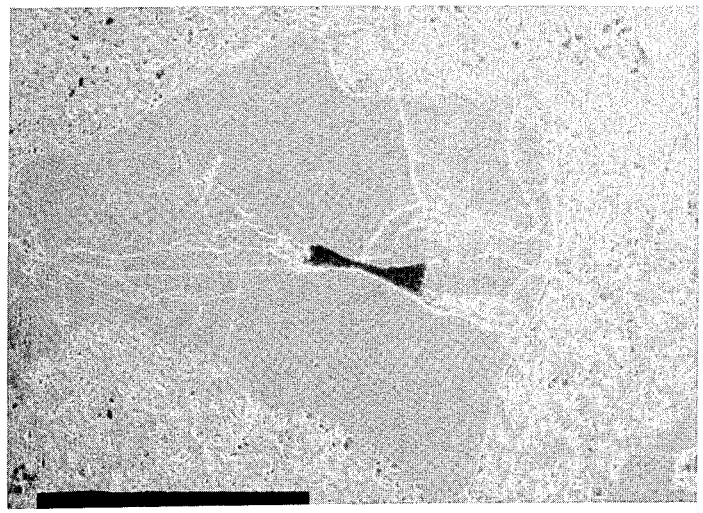
FIG. 1 is a 50× SEM photomicrograph of typical silicon carbide grains which had not been treated with a zirconium orthosulfate solution prior to being bonded with silicon nitride.
Figure 2:
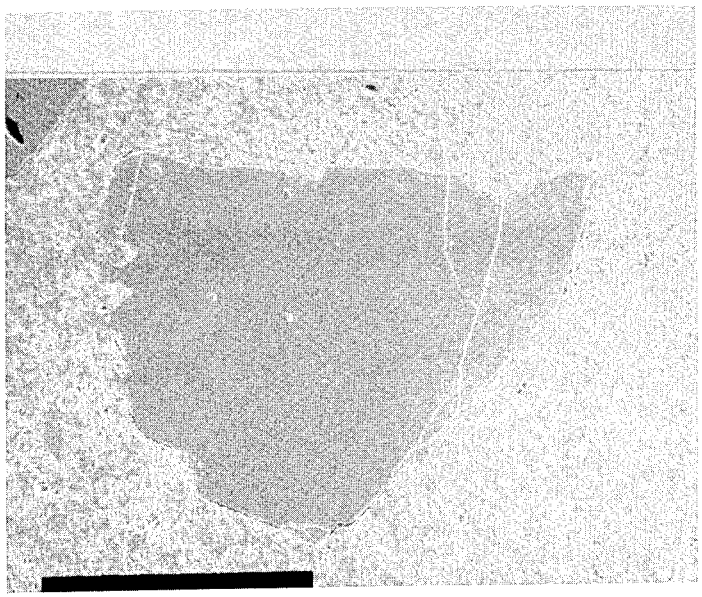
FIG. 2 is a 50× SEM photomicrograph of similar silicon carbide grain which had been treated with a zirconium orthosulfate solution prior to being bonded with silicon nitride within the scope of the instant invention.

The invention departs from and distinguishes over the prior art by the addition to the coarse silicon carbide grain or the bond of from 0.5 to 2% of zirconium oxide in the form of 1% to 4% of zirconium orthosulfate as a solution or a solid. A solution is preferable in order to facilitate partial penetration of the silicon carbide grain by the zirconium compound which is to become zirconium oxide when the formed product is nitrided and fired. It is believed that a significant contributor to the improvement in modulus of rupture of the invention may be the fact that the zirconium compound actually partially penetrates the coarse silicon carbide grain and when converted to zirconium oxide, causes substantial fracturing of the grain. This may be seen quite clearly in FIGS. 1 and 2 of the drawing. FIG. 1 is a 50× SEM photomicrograph of typical silicon carbide grains which had not been treated with a zirconium orthosulfate solution prior to being bonded with silicon nitride to form a test bar; FIG. 2 are similar typical silicon carbide grains which had been treated with zirconium orthosulfate prior to bonding into a test bar. The grains of silicon carbide shown in FIG. 1 exhibit numerous fissures or cracks. The untreated grains in FIG. 2 show very few cracks.

In order to directly compare the effect on the properties of the invention refractory material where the zirconia was added to the composition as zirconia per se and where the zirconia was added to the composition originally as zirconium orthosulfate, seven different mixing techniques and mix variations were made and four test bars, 9"×2¼"×¼", were hydraulically pressed at 3 tons/sq.in. from each variation. The bars were fired in the nitrogen tunnel kiln. The mixing techniques were as follows: 1. The 3.2 parts zirconium orthosulfate crystals equivalent to 1.0% $ZrO_2$ were dried at 75° C. for 6 hours and ground with a mortar and pestle. The crystals, $H_2ZrO(SO_4) \cdot 3H_2O$, lost 2.5% by weight and pH remained the same. The powder was added to the bond mix and dry blended. The dry bond blend was added to the silicon carbide grain with water and mixed to make a pressing mix. 2. The 3.2 parts of zirconium orthosulfate crystals were dissolved in 7.25 parts of water to form a clear solution which was added to the blended bond mix. The wet bond mix was added to the dry grain and mixed to make a pressing mix. 3. The 3.2 parts of zirconium orthosulfate crystals were dissolved in 7.25 parts of water and mixed with the grains. The blended bond mix was added to the wet grains and mixed to make a pressing mix. 4. The 3.2 parts of zirconium orthosulfate in water were mixed with the grains. This was dried in an oven at 75° C. for six hours. The dried mass was broken down and blended bond mix was added with water and mixed to make a pressing mix. 5. 1.0 part of zirconia powder, monoclinic zirconia, was dry blended with the bond mix. The dry bond blend was added to the silicon carbide grain and mixed with 7.25 parts water to make a pressing mix. 6. 1.0 part of zirconia powder, stabilized zirconia with 5.5% CaO, was dry blended with the bond mix. The bond blend was added to the silicon carbide grain and mixed with 7.25 parts water to make a pressing mix. 7. 4.0 parts of stabilized zirconia powder were used with the Nicholson technique. A bentonite gel was made with 1.2 parts of bentonite in 4.8 parts of water and mixed with a blend of bond ingredients, silicon carbide grain and water to make a pressing mix.

The seven mix variations had the following parts by weight formulations:

| Variation Number | SiC Grain 1.2 FE92 | Bond Mix | ZPS*** Crystals | $ZrO_2$ | Water |
|---|---|---|---|---|---|
| 1 | 53.6 | 43.2 | 3.2 | 0 | 7.25 |
| 2 | " | " | " | 0 | " |
| 3 | " | " | " | 0 | " |
| 4 | " | " | " | 0 | " |
| 5* | " | " | 0 | 1.0 | " |
| 6** | " | " | 0 | 1.0 | " |
| 7** | 81.0 | 15.5 | 0 | 4.0 | " |

|  | Bond Mix for #1-#6 | Bond Mix for #7 |
|---|---|---|
| GMF SiC | 12.0 | 0 |
| −200 Silicon | 28.0 | 15.0 |
| $Fe_2O_3$ | 1.5 | 0 |
| Kaolin | 1.2 | 0 |
| Vee Gum | 0.5 | 0.5 |
| Bentonite | 0 | 1.2 |

*$ZrO_2$ was Zircoa A, monoclinic, −325 mesh
**$ZrO_2$ was Zircoa B, stabilized with 5.5% CaO, −325 mesh.
***ZPS was zirconium orthosulfate The density, modulus of rupture, and modulus of elasticity of the so prepared test bars were measured. As can be seen from the data in Table I, the mix variations of the invention numbers 1, 3, and 4, result in products superior to all of the prior art mixes containing zirconia per se, 5, 6, and 7. In fact two of the prior art formulations were so poor that the test bars broke during the firing step. One of invention formulations, i.e. mix number 2, was sub par also for some unexplainable reason but still superior to two of the three prior art compositions. The bars were all tested for MOR at room temperature on a six inch span under 3 point loading.

TABLE I

|  | Fired Density g/cc | MOR psi | MOE psi $\times 10^6$ |
|---|---|---|---|
| 1. Dried milled ZPS to powder. Blended ZPS powder with bond mix. Mixed dry bond and grain with water. | 2.54 | 7472 | 17.06 |
| 2. Mixed ZPS with water. Added solution to bond mix. Mixed wet bond and grain. | 2.51 | 4569 | 12.63 |
| 3. Mixed ZPS solution with grain. Mixed dry bond mix with grain. | 2.57 | 6817 | 16.83 |
| 4. Mixed ZPS solution with grain. Dried grain down. Mixed bond with grain and water. | 2.47 | 7505 | 15.18 |
| 5. Added Zircoa Z powder to bond mix. Added dry bond mix to grain. Mixed grain and bond with water. | 2.47 | 5369 | 11.93 |
| 6. Same as 5, but with Zircoa B. | Broke into pieces during firing. | | |
| 7. Mixed Zircoa B with bond and grain using Nicholson technique. | Broke into pieces during firing. | | |

It is not completely understood why the addition of zirconium orthosulfate to either the body or directly on the grain produces a superior product as compared to putting zirconia per se into the mix because most certainly the zirconium orthosulfate ends up as zirconia after the product is fired. However, be that as it may, the product of the invention is much superior to product made by any of the teachings of the prior art.

The present nitride bonded refractory material has numerous end uses such as crucibles, combustion boats, mortars and laboratory ware of all kinds, as well as turbine blades, rocket nozzles, ventures and the like, particularly where oxidation is a real problem. The present invention is particularly valuable in products that, for one reason or another, need to be thin. Typical products of the latter are kiln batts or plates used to carry green refractory ware during firing, as described briefly above.

The product of the present invention can be fabricated by any of the known methods for forming silicon nitride bonded silicon carbide, with the added step of coating the silicon carbide grain or adding to the nitride bond with zirconium orthosulfate. The coated grain may be mixed with a bond or the zirconium orthosulfate may be added to a bond made up of finely divided silicon metal, a small amount of clay and minor amount of an organic temporary binder to give the shape green strength. The mixture is placed in a mold of appropriate configuration and pressed at room temperature. The green shape is then removed from the mold and fired at for example 1200° C. in a nitrogen atmosphere to convert the silicon metal to silicon nitride; usually some amount of silicon oxynitride is also present. A variant of the foregoing is the utilization of fine, reactive silicon carbide alone or in combination with powdered silicon metal, and a small amount of iron oxide along with the clay and organic binder.

All percentages recited herein are based on the total mix or the total fired product.

EXAMPLES OF THE PREFERRED EMBODIMENTS

EXAMPLE II

A mix having the weight percent composition of Example I shown in Table I was prepared in the conventional manner adding sufficient water to produce a final mix with satisfactory hydraulic pressing properties. The 10F silicon carbide grain had a particle size distribution of 1-6% on an 8 mesh screen (all mesh sizes based on U.S. Standard Sieve Series unless indicated otherwise), 4-14% on a 12 mesh screen, 25-35% on a 25 mesh screen, 31-41% on a 100 mesh screen, 7-18% on a 325 mesh screen, and 9-17% through a 325 mesh screen. The −200 mesh elemental silicon was technical grade containing 98.5% silicon. The specific clay utilized was bentonite and was incorporated into the mix as a fine powder. Goulac, calcium lignosulfonate, was used as a temporary binder.

Twelve 9"×2.25"×0.75" test bars were pressed at 3.5 tons per square inch, dried, and fired in a nitrogen kiln at a temperature of 1400° C. with a soak at that temperature of 10 hours.

The properties of the test bars were measured and are shown in Table II. The modulus of elasticity (MOE) was measured as Young's Modulus. The modulus of rupture (MOR) was measured at room temperature, 1250° C. and 1450° C.; the MOR tests were carried out using three point loading at about 0.05 inches per minute on an 8" span.

EXAMPLE III

This example was the same as Example I except that the silicon carbide grain was screened to remove the 8 mesh grains leaving 0-1% retained on an 8 mesh screen and 4-10% on a 12 mesh screen. Kaolin was the clay used and 1% $Fe_2O_3$ was included in the mix. The properties and composition are listed in Table II.

Examples I and II are prior art silicon nitride bonded silicon carbide refractories.

EXAMPLE IV

The resulting product here was similar to that of Example II except that the silicon carbide grain was first coated with an aqueous solution of zirconium orthosulfate so as to deposit 3.2% by weight of that zirconium compound. The composition and properties are shown in Table II.

The mix preparation, molding and firing were carried out in the same manner as in Examples I and II which was also true of subsequent Examples IV through IX.

The zirconium orthosulfate solution was made by adding 140 grams of water to 64 grams of the salt which was then added to 1300 grams of silicon carbide grains in a paddle mixer. Preblended bond, in an amount of 700 grams, was added to the so treated grain. The mix was then processed into 9"×2.25"×0.75" bars in the manner described in Example I. The compositional details and properties of these bars appear in Table II.

EXAMPLE V

This was the same as Example III except that 5% of the silicon carbide grain was replaced by reactive silicon carbide i.e. silicon carbide with a particle size distribution of 10 microns and finer with an average of about 2 microns. The properties of the resulting bars are in Table II below.

EXAMPLES VI, VII, VIII

These examples were basically the same as Example IV except that the compositions were modified to each contain 10% reactive silicon carbide and 2, 3, and 4% respectively of zirconium orthosulfate. The compositions and properties are contained in Table II.

EXAMPLES IX and X

These examples showed the optimum quantitative range of fine silicon metal powder and reactive silicon carbide. The mixes and test bars were fabricated in the same manner as the previous examples. The composition and properties are shown in Table II.

TABLE II

| Example | I | II | III | IV | V | VI | VII | VIII | IX |
|---|---|---|---|---|---|---|---|---|---|
| 10F SiC grain | 86.0 | 70.0 | 65.0 | 65.0 | 65.0 | 53.0 | 53.5 | 53.3 | 53.3 |
| −200 Si | 12.0 | 27.0 | 32.0 | 27.0 | 20.0 | 30.0 | 30.0 | 25.0 | 30.0 |
| Reactive SiC | 0 | 0 | 0 | 5.0 | 10.0 | 10.0 | 10.0 | 15.0 | 10.0 |
| Clay | 2.0 | 2.0 | 2.0 | 2.0 | 2.0 | 2.0 | 2.0 | 2.0 | 2.0 |
| $Fe_2O_3$ | 0 | 1.0 | 1.0 | 1.0 | 0.5 | 2.0 | .5 | 1.5 | 1.5 |
| ZPS* | 0 | 0 | 3.2 | 3.2 | 2.0 | 3.0 | 4.0 | 3.2 | 3.2 |
| Goulac | 1.0 | 1.0 | 1.0 | 1.0 | 1.0 | 1.0 | 1.0 | 1.5 | 1.5 |
| Fired Density g/cc | 2.60 | 2.54 | 2.62 | 2.65 | 2.56 | 2.58 | 2.59 | 2.61 | 2.65 |
| MOE($\times 10^6$)PSI | 21.0 | 18.2 | 19.1 | 22.4 | 17.1 | 16.7 | 17.9 | 14.4 | 21.0 |
| MOR, RT | 5620 | 5932 | 8080 | 9262 | 6604 | 7317 | 6663 | 9306 | 8508 |
| MOR, 1250° C. | 7990 | 8183 | 10712 | 11480 | 9023 | 8814 | 9922 | 6775 | 8317 |
| MOR, 1450° C. | 4840 | 7171 | 8576 | 10134 | — | — | — | 9727 | 8892 |
| MOR:MOE($\times 10^{-4}$) | 2.9 | 3.2 | 4.2 | 4.1 | 3.9 | 4.4 | 3.7 | 4.8 | 4.0 |

*zirconium orthosulfate

The foregoing examples show the major improvements which result from the addition of a zirconium oxide producing compound to the silicon carbide grain. The improvement in strength, as compared to the prior art, is self evident from the strength data in Tables I and II.

What is claimed is:

1. A refractory raw batch mix consisting essentially of from 40 to 80% by weight of silicon carbide grains, 12 to 40% by weight of elemental silicon, 0.5 to 4% by weight of clay; 0.5 to 4% by weight of iron oxide, and from 1% to about 4% by weight of zirconium orthosulfate.

* * * * *